United States Patent [19]

Headrick

[11] Patent Number: 5,060,363

[45] Date of Patent: Oct. 29, 1991

[54] APPARATUS AND METHOD FOR FORMING HOLES IN THERMOPLASTIC WEBBING

[75] Inventor: Bradley J. Headrick, Walland, Tenn.

[73] Assignee: BJ Automations, Inc., Walland, Tenn.

[21] Appl. No.: 581,737

[22] Filed: Sep. 12, 1990

[51] Int. Cl.[5] .................... B23Q 11/14; B23B 35/00
[52] U.S. Cl. .................................... 29/557; 264/156;
   408/1 R; 408/42; 409/136; 425/DIG. 37;
   425/DIG. 119
[58] Field of Search ............. 29/551, 558, 432, 432.1,
   29/429, DIG. 3; 83/13, 15, 78, 686; 408/1 R,
   31, 42, 56, 57; 409/136; 264/155, 156; 425/306,
   DIG. 37, DIG. 119

[56] References Cited

U.S. PATENT DOCUMENTS

| | | | |
|---|---|---|---|
| 666,217 | 1/1901 | Abbey | 408/43 |
| 2,898,785 | 8/1959 | Quick et al. | 408/97 |
| 3,525,279 | 8/1970 | Christian | 264/155 X |
| 3,654,829 | 4/1972 | Anderson | 83/78 |
| 3,701,352 | 10/1972 | Bosworth | 128/305 |
| 3,891,739 | 6/1975 | Lawson | 264/155 |
| 3,966,554 | 12/1962 | Hanson | 408/50 |
| 4,060,333 | 11/1977 | White | 408/103 |
| 4,136,275 | 1/1979 | McCullough | 29/432 |
| 4,642,868 | 2/1987 | Pandell | 29/429 |
| 4,790,695 | 12/1988 | Abernethy | 408/115 R |

FOREIGN PATENT DOCUMENTS

| | | | |
|---|---|---|---|
| 96711 | 6/1982 | Japan | 408/1 R |
| 134708 | 8/1983 | Japan | 264/156 |
| 1166898 | 7/1985 | U.S.S.R. | 29/557 |
| 2181375 | 4/1987 | United Kingdom | 408/1 R |

*Primary Examiner*—William Briggs
*Attorney, Agent, or Firm*—Luedeka, Hodges, Neely & Graham

[57] ABSTRACT

An apparatus and method for forming a hole in webbing constructed of thermoplastic material utilizes a clamping assembly for holding the webbing in a stationary condition for working thereon, a rotatable drilling tool having an elongated shank with a leading end and a flute spiraling along the shank from the leading end, and a burner for heating a portion of the drilling tool shank adjacent the leading end. The drilling tool is supported adjacent the clamping assembly for rotation of the tool about a rotation axis which corresponds with the longitudinal axis of the shank and for movement of the leading end of the tool along a linear path corresponding with the rotation axis into and out of the webbing held by the clamping assembly. After a portion of the drilling tool shank adjacent its leading end is heated to a temperature which is at lesate as great as the melting temperature of the thermoplastic material of the webbing, the leading end of the heated drilling tool is directed along the linear path of movement through the webbing as the tool is rotated about its rotation axis to form a hole in the webbing. The hole formed in the webbing is devoid of melt build-up or flash and readily accommodates the insertion of grommets or eyelets therethrough.

20 Claims, 7 Drawing Sheets

APPARATUS AND METHOD FOR FORMING HOLES IN THERMOPLASTIC WEBBING

BACKGROUND OF THE INVENTION

This invention relates generally to means and methods for forming holes in workpieces and relates more particularly to means and methods for forming holes in webbing comprised of thermoplastic material.

Webbing comprised of synthetic thermoplastic materials such as Nylon ®, polyester or polypropylene, is commonly used in the fabrication of straps for pet collars, horse halters, military slings and luggage straps. Each of such straps commonly includes a series of holes along its length and utilizes a fastener which may be passed through any one of the holes to, for example, accommodate an adjustment in the length of the strap or secure the strap in a desired position.

To form a hole in webbing comprised of thermoplastic material, it is known that a metal spike may be heated and then forced through the webbing in what is believed to be a combination melting and punching action. Typically, the material melted by the heated spike is forced radially outwardly where the material accumulates as melt build-up or flash adjacent the edge of the hole. However, hole-forming methods involving such techniques are likely to result in holes having edges which are susceptible to cracking and are not always satisfactory from an appearance standpoint. Furthermore, if a grommet or eyelet is desired to be installed through the formed holes, the material which has accumulated adjacent the edges of the holes may render installation of the grommets or eyelets difficult.

Accordingly, it is an object of the present invention to provide a new and improved apparatus and method for forming holes in webbing comprised of thermoplastic material.

Another object of the present invention is to provide such an apparatus and method for forming holes having edges which are not susceptible to cracking and are aesthetically appealing.

Still another object of the present invention is to provide such an apparatus and method for forming holes in thermoplastic webbing through which grommets or eyelets may be easily installed.

A further object of the present invention is to provide such an apparatus which is uncomplicated in construction and effective in operation.

SUMMARY OF THE INVENTION

This invention resides in an apparatus and method for forming holes in webbing comprised of thermoplastic material.

The apparatus includes a clamping assembly for holding the webbing in a stationary condition for working thereon and a rotatable drilling tool having an elongated shank including a leading end and at least one flute which spirals along the periphery of the shank from the leading end thereof. The drilling tool is supported adjacent the clamping assembly for rotation about a rotation axis corresponding with the longitudinal axis of the shank and for movement of the leading end of the tool along a linear path corresponding with the rotation axis into and out of the webbing held by the clamping assembly. Means are connected to the drilling tool for rotating the tool about its rotation axis, and means are associated with the drilling tool for heating a portion of the drilling tool shank adjacent the leading end thereof to a temperature which is at least as great as the melting temperature of the thermoplastic material of the webbing. The apparatus also includes means for directing the leading end of the drilling tool into and out of the webbing as the tool is rotated about its rotation axis so that a hole is formed in the webbing by heating the drilling tool shank as aforesaid and then directing the leading end of the drilling tool into and out of the webbing as aforesaid.

The method of the invention includes the steps involved in using the apparatus of the invention. Such steps include the steps of securing the webbing in a stationary condition for working thereon, heating a portion of the drilling tool shank adjacent the leading end thereof to a temperature which is at least as great as the melting temperature of the thermoplastic material of the webbing, and directing the leading end of the heated drilling tool through the webbing as the tool is rotated about its rotation axis to form a hole in the webbing.

DETAILED DESCRIPTION OF A PREFERRED EMBODIMENT

Figure 1:
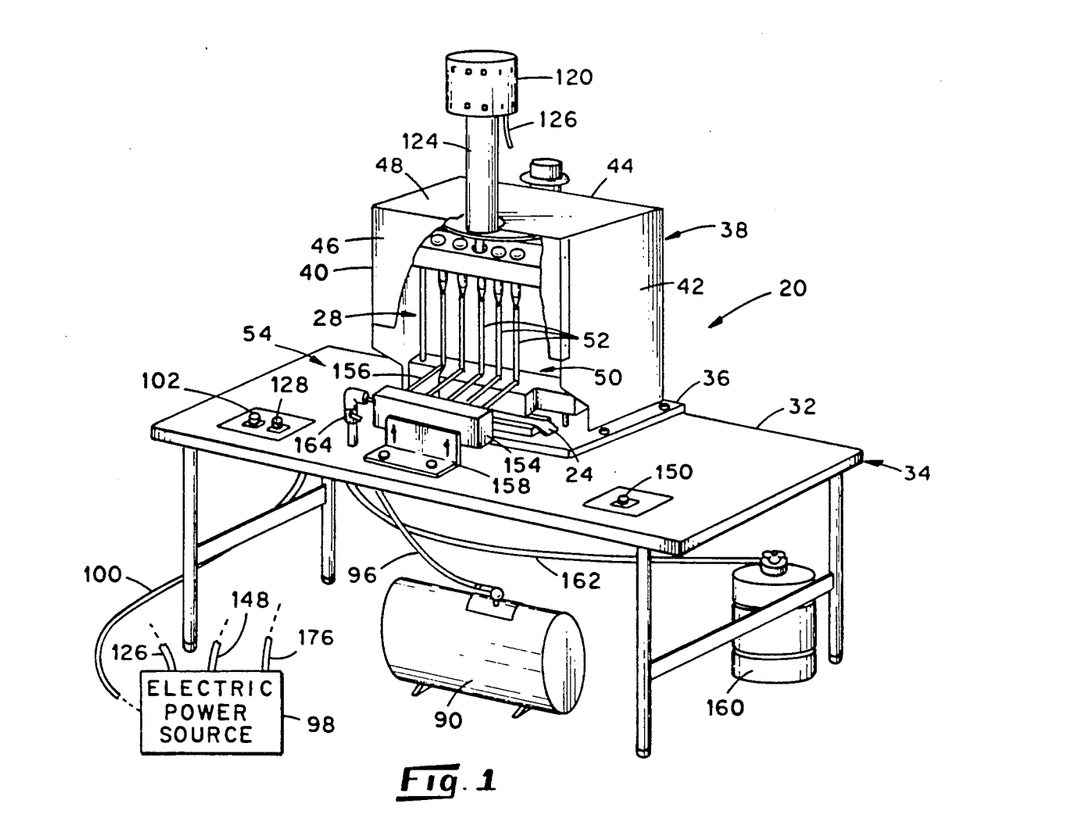
FIG. 1 is a perspective view of an embodiment, shown partially cut-away, of an apparatus for forming a series of holes in a piece of webbing material.

Turning now to the drawings in greater detail, there is illustrated in FIG. 1 an embodiment 20 of an apparatus shown being used to form a series of holes in a workpiece 24. The workpiece 24 is a piece of webbing being in the form of a relatively thin flexible strap 26 (FIG. 2) comprised of thermoplastic fabric which has been woven from thermoplastic threads or yarns into a substantially flat, or two-sided, arrangement. The material out of which the strap 26 is constructed may be any of a number of synthetic materials such as Nylon ®, polypropylene or polyester.

Figure 3:
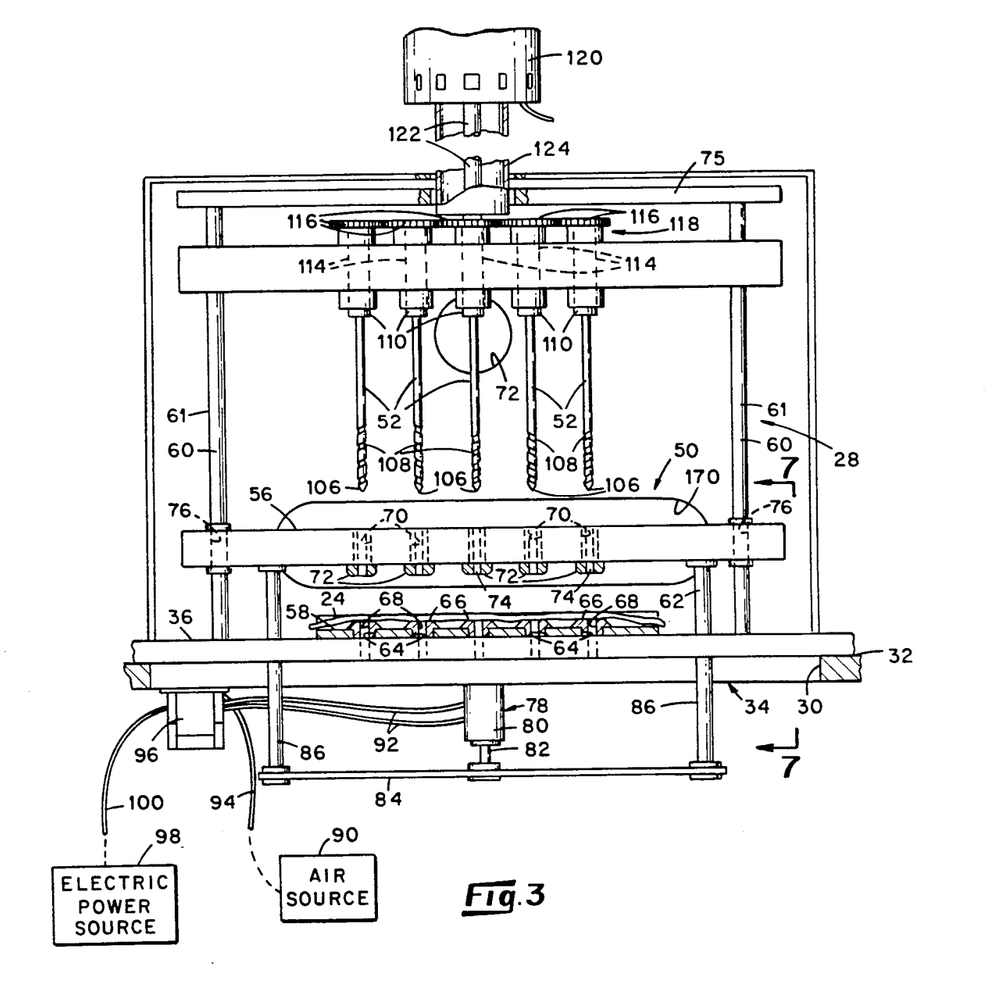
FIG. 3 is an elevational view, as viewed from the front and shown partially cut-away, of the interior of the compartment of the FIG. 1 apparatus shown with its front cover removed and illustrating only one of two cylinder assemblies of the FIG. 1 apparatus.

As best shown in FIGS. 1 and 3, the apparatus 20 includes a frame 28 which is mounted over a cut-out 30 formed in the top 32 of a table 34 so that various components of the apparatus 20, described herein, depend downwardly through the cut-out 30. The frame 28 includes a base plate 36 which has been attached to the table top 32 so as to overlie the cut-out 30, and a hood-like compartment 38 is positioned upon the base plate 36 so as to substantially enclose a major portion of the frame 28. The compartment 38 includes two opposite sides 40, 42, a back 44, a front 46 and a top 48, and the lower edges of the sides 40, 42 and back 44 are attached to the base plate 36 to stably secure the compartment 38 upon the base plate 36. The front 46 of the compartment 38 is secured along its side edges to the compartment sides 40, 42 and serves as a removable panel through which access can be had to the interior of the compartment 36.

Figure 2:
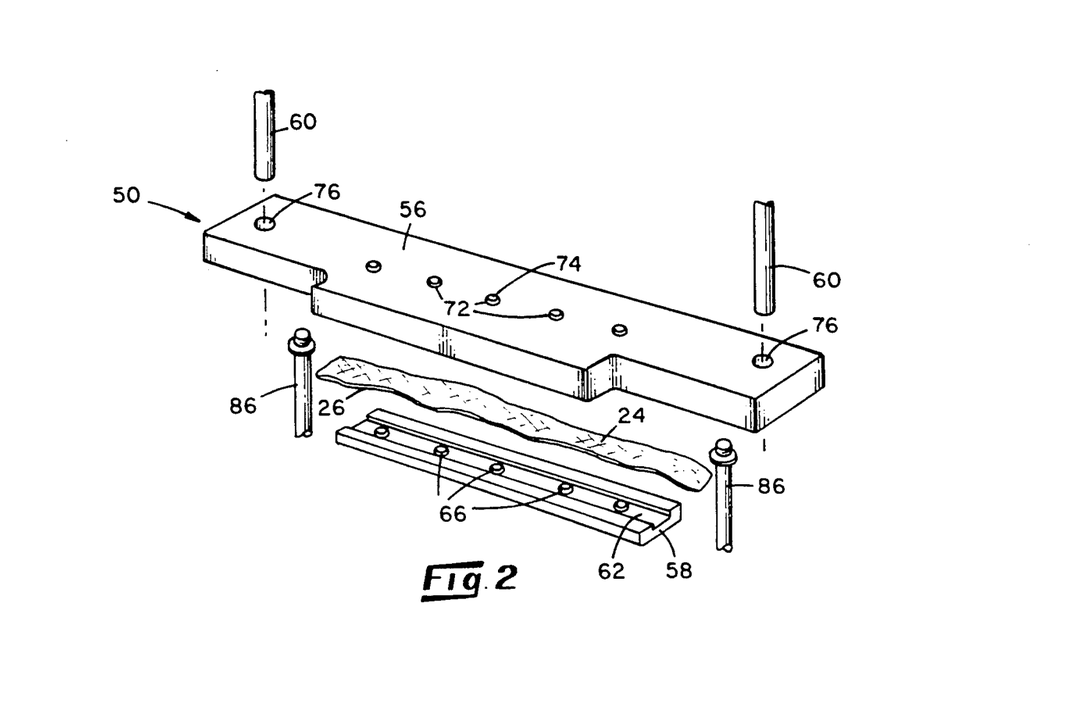
FIG. 2 is an exploded perspective view of a fragment of the apparatus of FIG. 1.
Figure 4:
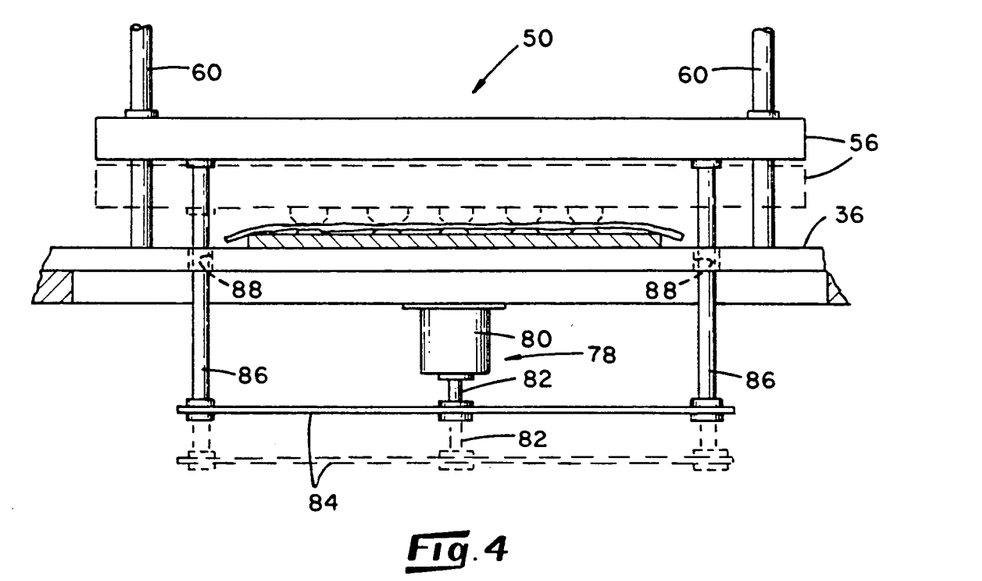
FIG. 4 is a view similar to that of FIG. 3 illustrating the clamping assembly of the FIG. 1 apparatus when in clamped and unclamped positions.

With reference to FIGS. 2-4, the apparatus 20 includes clamping means 50 for holding the workpiece 24 in a stationary condition while being worked upon and rotatable cutting tools 52 which are each supported for rotation about an axis of rotation above the clamping means 50. As will be apparent herein, each of the cutting tools 52 is movable along a linear path through the clamping means 50 and the workpiece 24 held therein during a hole-forming operation. The apparatus 20 also includes means, indicated 54, for heating each cutting tool 52 to a temperature which is at least as high as the melting temperature of the material out of which the workpiece is constructed prior to the movement of the cutting tools 52 through the workpiece 24.

The clamping means 50 includes a pair of opposing upper and lower clamp members 56 and 58, respectively, having block-like bodies which are movable toward and away from one another as the upper clamp member 56 is moved along a pair of parallel guideways 60 comprising part of the frame 28. The lower clamp member 58 is fixed in position atop the base plate 36 and defines a cut-out 62 in its top surface for accepting the workpiece 24 placed lengthwise therein and five internally-threaded holes 64 opening upwardly out of the cut-out 62. Threaded within each hole 62 is a removable insert 66 having a central bore 68 wherein the central axis of the bore 68 is positioned in registry with the central, i.e., longitudinal, axis of its corresponding hole 64. In addition, each bore 68 has a diameter which corresponds to the diameter of the cutting tool 52 disposed above the clamp members 56, 58. The upper end surface of each insert 66 is somewhat conical in form so as to protrude upwardly as a path is traced across the upper end surface from the side edges thereof to the edge of the bore 68.

The upper clamp member 56 includes five internally-threaded holes 70 which extend between its upper and lower surfaces, and inserts 72 are threadably received by the holes 70. Each insert 72 has a central bore 74 which is positioned in registry with the longitudinal axis of its corresponding hole 70 and has a diameter which corresponds generally to the diameter of the cutting tool 52 disposed above the clamp member 56, as shown in FIG. 3. The lower end surface of each insert 72 is somewhat conical in form so as to protrude downwardly as a path is traced across the lower end surface from the side edges thereof to the edge of the bore 74.

In preparation of a hole-forming operation to be performed with the apparatus 20, the clamp members 56, 58 are arranged in a spaced relationship, as illustrated in solid lines in FIG. 4, and the workpiece 24 is placed along the cut-out 62 of the lower clamp member 58. The upper clamp member 56 is then moved to a lowered position, as illustrated in phantom in FIG. 4, so that the workpiece 24 is clamped between the clamp members 56, 58. The cutting tools 52 are subsequently directed through the bores 68, 74 provided in the inserts 66, 72 to form the desired holes in the workpiece 24. Accordingly, the bores 68, 74 provided in the inserts 66, 72 of the lower and upper clamp members 58, 56 are suitably aligned and arranged in a pattern along the clamp members which corresponds to the pattern and position of the holes desired to be formed in the workpiece 24.

The guideways 60 of the frame 28 include four rods 61 which are oriented generally vertically and extend through openings 76 (FIG. 2) provided in the upper clamp member 56. The upper and lower ends of the rods 61 are fixed to the base plate 36 and an upper plate 75 (FIG. 3) comprising part of the frame 28. As the upper clamp member 56 moves toward and away from the lower clamp member 58 between its solid-line and phantom-line positions illustrated in FIG. 4, the upper clamp member 56 slidably moves linearly along the guideways 60 so that the bores 68, 74 of the inserts 66, 72 are continually maintained in registry with one another.

For purposes of moving the upper clamp member 56 toward and away from the lower clamp member 58 to clamp the workpiece 24 between the members 56, 58 or release the workpiece 24 from a clamped condition between the members, 56, 58, there is provided a cylinder assembly 78, shown in FIGS. 3 and 4, appropriately connected between the base plate 36 and the upper clamp member 56. The cylinder assembly 78 includes an air cylinder 80 having a body which is fixed to the underside of the base plate 36 and a ram 82 which is positioned within the cylinder 80 for movement between a retracted position, as illustrated in solid lines in FIG. 4, and an extended position, as illustrated in phantom in FIG. 4. In the depicted apparatus 20, the ram 82 is connected to the upper clamp member 56 by means of a horizontally-oriented bracket 84 fixedly joined to an end of the ram 82 and a pair of rods 86 which are fixed at opposite ends to the bracket 84 and the underside of the upper clamp member 56. The rods 86 are slidably received by openings 88 (FIG. 4) provided in the base plate 36 so that as the upper clamp member 56 is raised or lowered, the rods slidably move through the openings 88.

In the depicted apparatus 20, the cylinder assembly 78 is arranged beneath the base plate 36 so that as the ram 82 is moved between its retracted and extended positions, the bracket 84 is moved between upper and lower positions. Therefore, by actuating the cylinder assembly 78 so that the ram 82 moves downwardly, the upper clamp member 56 moves downwardly along the guideways 60 into clamping relationship with the workpiece 24 positioned upon the lower clamp member 58. On the other hand, when the ram 82 is moved upwardly, the upper clamp member 56 moves upwardly along the guideways 60 and away from the lower clamp member 58 and the workpiece 24 positioned thereon.

The cylinder assembly 78 is a double-acting type of cylinder having a pair of internal chambers for urging the ram 82, under the influence of air pressure, toward either of its retracted or extended positions. Air from a pressurized air source 90 is routed to the internal chambers of the cylinder assembly 76 by way of air hoses 92, 94, and an electrically-operated solenoid valve 96 is appropriately connected to the hoses 92, 94 for control of the actuation of the cylinder assembly 76. In the depicted apparatus 20, the solenoid valve 96 is mounted beneath the top 32 of the table 34 and is connected to the hoses 92, 94 so that until the valve 96 is actuated, a first of the internal chambers of the assembly 76 remains pressurized so that the ram 82 is maintained in its retracted position. Upon actuation of the valve 96, the air in the first internal chamber of the assembly 76 is vented and the second internal chamber is pressurized so that the ram 82 is moved downwardly from its retracted position toward its extended position. As the ram 82 moves downwardly, the upper clamp member 56 moves downwardly into clamping relationship with the workpiece 24. Upon de-actuation of the valve 96, the second chamber is vented and the first chamber is re-pressurized to return the ram 82 from its extended position to its retracted position and thus return the upper clamp member 56 from its lowered position to its raised position. Power for the solenoid valve 96 is supplied from an electric power source 98 through a cord 100, and actuation of the solenoid valve 96 is controlled by means of a two-position, e.g., a push-button, switch 102 (FIG. 1) mounted in the table 34 and appropriately wired to the valve 96.

Figure 5:
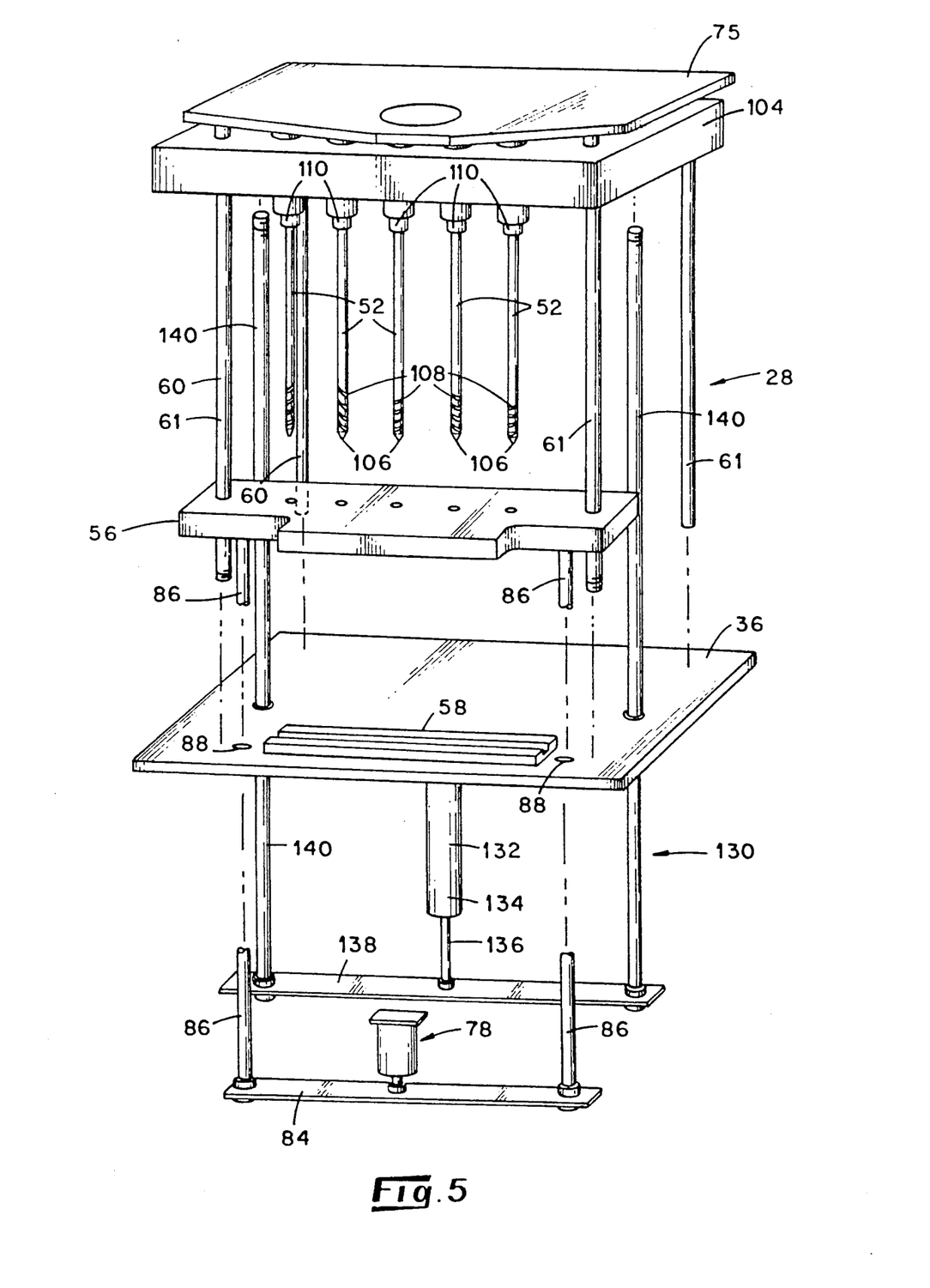
FIG. 5 is an exploded perspective view of various components of the FIG. 1 apparatus.

With reference to FIGS. 3 and 5, the cutting tools 52 of the apparatus 20 are in the form of steel drill bits which are supported in parallel relationship with one another by means of a mounting block 104. The mounting block 104 includes openings through which the four guideway rods 61 extend so that the block 104 may be slidably moved along the rods 61. The cutting tools 52 are supported by the mounting block 104 so that the longitudinal axis of each bit is positioned in registry with the aligned bores 68, 74 of the inserts 66, 72 positioned within the upper and lower clamp members 56, 58. Each cutting tool 52 has a shank which is relatively lengthy, e.g., about eight inches in length, and has a cutting edge adjacent its leading end, indicated 106, and and at least one flute 108 which spirals upwardly along the length of the tool 52 from the leading end 106. The upper end of each tool 52 is suitably secured within a rotatable chuck 110 which depends downwardly from the mounting block 108 so that each tool 52 may be rotated about an axis of rotation which corresponds with, or is coincident with, the longitudinal axis of the tool.

Each chuck 110 includes a stem which is suitably journaled within the mounting block 104 and includes a portion 114 which extends above the upper surface of the block 104. A toothed gear 116 is appropriately keyed to each of the chuck stem portions 114 and is suitably meshed with an adjacent gear 116 to form a gear train arrangement 118 so that by rotating the stem of one chuck 110, all of the chucks 110 are rotated.

In the depicted apparatus 20, the chucks 110 are rotated by means of an electric motor 120 having a shaft 122 which is suitably connected in driving relationship with the chuck 110 positioned in the center of the gear train arrangement 118. The motor 120 is supported above the compartment 38 by means of a vertically-oriented tube 124 which is connected at its lower end to the mounting block 104 and which encircles the motor shaft 122. When energized, the motor 120 rotates the center chuck 110 clockwise, as viewed from above, so that the two chucks 110 adjacent the center chuck 110 are rotated counterclockwise and the two outermost chucks 110 are rotated clockwise. In order that the flutes 108 of the cutting tools 52 suitably transport material which has been removed from the workpiece 24 by the leading ends 106 from the site at which the material is being cut, the flutes 108 spiral along the shank of the center and two outermost tools 52 in a right-handed pattern while the flutes spiral along the shank of the two tools 52 adjacent the center tool 52 in a left-handed pattern.

The power for the motor 120 is supplied from the electric power source 98 through a cord 126, and a two-position switch 128 (FIG. 1) is mounted within the table 34 and appropriately wired to the motor 120 to enable an operator to manually control the motor operation.

Figure 6:
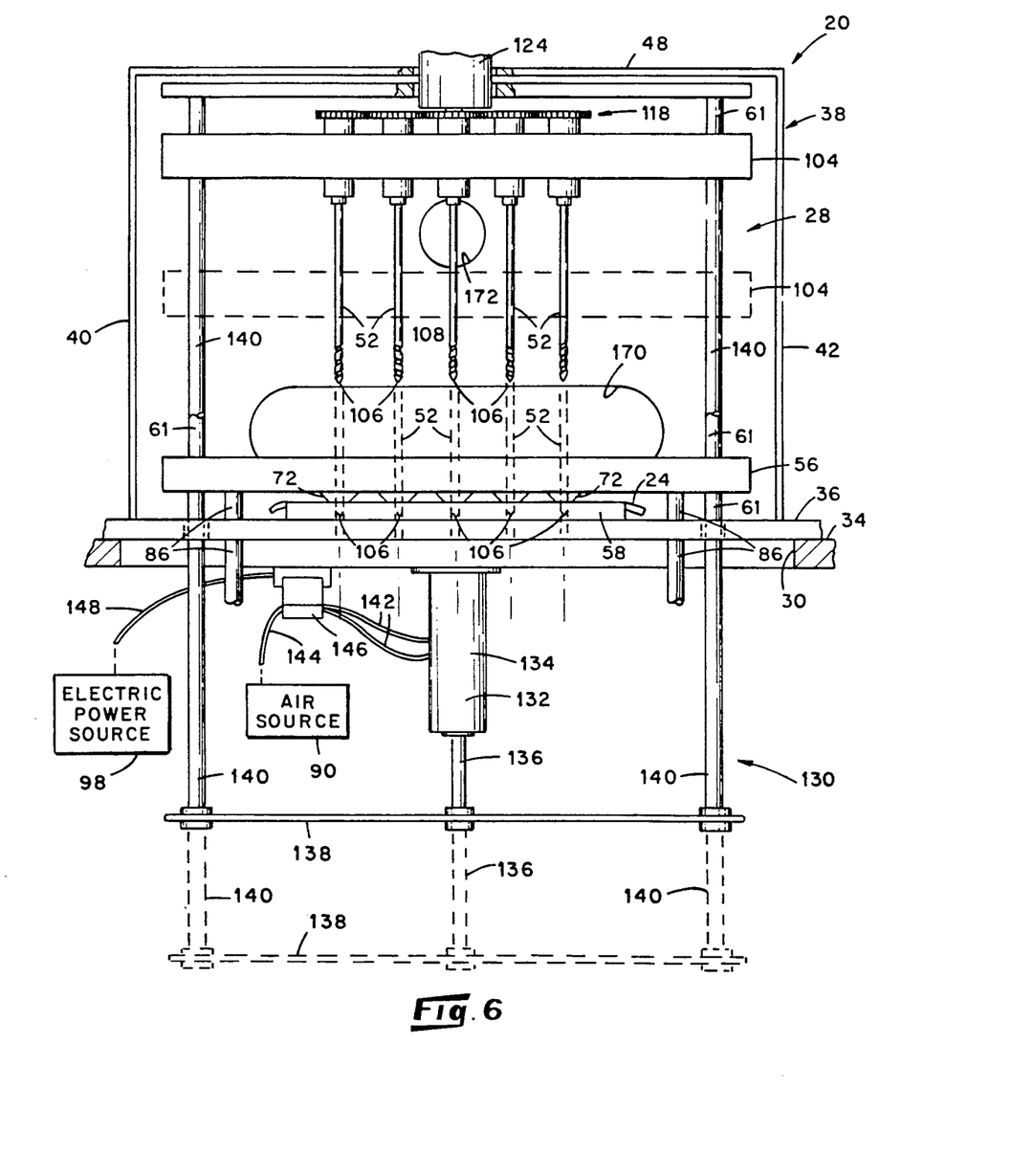
FIG. 6 is a view similar to that of FIG. 3 having portions cut-away and illustrating the cylinder assembly of the FIG. 1 apparatus not illustrated in FIG. 3.

With reference to FIGS. 5 and 6, the apparatus 20 also includes means, indicated 130, for moving the mounting block 104 toward and away from the clamp members 56, 58 in a manner which directs the cutting tools 52 upwardly and downwardly through the aligned bores 68, 74 of the inserts 66, 72 so that the leading ends 106 of the tools 52 are directed through the workpiece 24. In the depicted apparatus 20, the moving means 130 includes an air cylinder assembly 132 having a cylinder 134 which is fixed to the underside of the base plate 36 and a ram 136 which is positioned within the cylinder 134 for movement between a retracted position, as illustrated in solid lines in FIG. 6, and an extended position, as illustrated in phantom in FIG. 6. The ram 136 is connected to the mounting block 104 by means of a horizontally-oriented bracket 138 attached to the lower end of the ram 136 and a pair of rods 140 which are fixed at opposite ends to the bracket 138 and the underside of the mounting block 104.

The cylinder assembly 132 is a double-acting type of cylinder wherein the ram 136 may be urged, under the influence of air pressure, toward either of its retracted or extended positions. Air from the pressurized air source 90 is routed to the cylinder assembly 132 by way of air hoses 142, 144, and an electrically-operated solenoid valve 146 is suitably connected to the hoses 142, 146 for control of the actuation of the cylinder assembly 132. In the depicted apparatus 20, the ram 136 is maintained by air pressure in its retracted position until the solenoid valve 146 is actuated. Upon actuation of the valve 146, the ram 136 is urged downwardly from its retracted position toward its extended position so that the cutting tools 52 are directed downwardly through the aligned bores 68, 74 of the inserts 66, 72. Upon de-actuation of the valve 146, the ram 136 returns to its retracted position so that the cutting tools 52 are withdrawn from the aligned bores 68, 74. Electrical power for the valve 146 is supplied from the source 98 through a cord 148, and a two-position switch 150 (FIG. 1) is mounted in the table 34 and appropriately wired to the valve 146 in a manner permitting an operator to manually control the actuation of the cylinder assembly 134.

Figure 7:
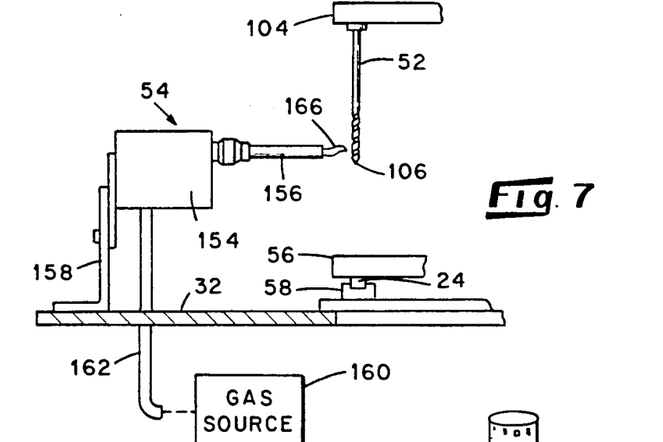
FIG. 7 is a cross-sectional view of a fragment of the FIG. 1 apparatus taken about along line 7—7 of FIG. 3.

With reference to FIGS. 1 and 7, the heating means 54 of the apparatus 20 is utilized for heating the cutting tools 52 adjacent the leading ends thereof so that the tools 52 are relatively hot when they are moved downwardly through the clamp members 56, 58 and the workpiece 24 position therebetween. In the depicted apparatus 20, the heating means 54 includes a manifold assembly 154 having five gas burners 156 supported adjacent the tools 52 by a support bracket 158. As best shown in FIG. 7, the support bracket 58 is attached to the table top 32 and supports the burners 156 generally horizontally so that the ends of the burners 156 are directed generally toward the lower ends of the tools 52 when the tools 52 are positioned in their raised position. The burners 156 are connected to a gas source 160 through a suitable conduit 162 so that a stream of gas routed through each burner 156 may be ignited to provide a flame 166 which impinges upon a corresponding one of the tools 52. A valve 164 is mounted in the conduit 162 as illustrated in FIG. 1 to provide means by which the flow of gas through the burners 156 may be manually controlled.

Figure 8:
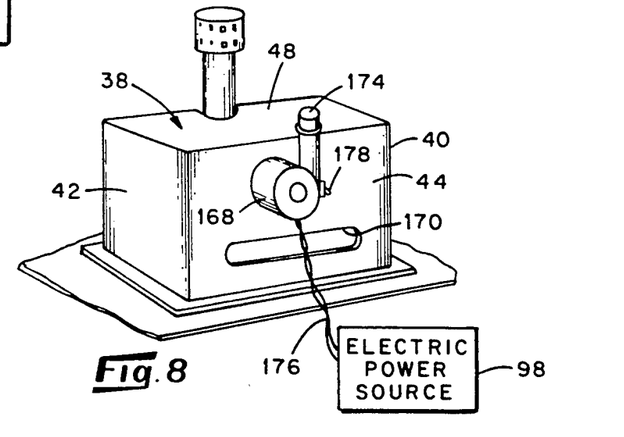
FIG. 8 is a perspective view of a fragment of the FIG. 1 apparatus as viewed generally from the back thereof.

For purposes of preventing a build-up of heat and gaseous products within the compartment 38 of the apparatus 20, there is provided a slot 170, best shown in FIGS. 3 and 8, in the compartment back 44 and an electrically-powered centrifugal blower 168 mounted upon the compartment 38 for withdrawing gaseous products from the compartment interior. In this connection, the blower 168 is supportedly attached to the back 44 of the compartment 38 and has an inlet which communicates with the interior of the compartment 38 through a hole 172 formed in the back 44 and has an outlet 174 which may be connected to suitable ductwork (not shown) for exhausting the gaseous products to a remote location. Electrical power is supplied to the blower 168 from the source 98 through a cord 176, and control of the blower actuation may be had with a two-position switch 178 mounted on one side of the blower 168.

To use the apparatus 20 for forming a series of five holes in the workpiece 24, the workpiece 24 is initially placed in position along the cut-out of the lower clamp member 56 so that the locations in the workpiece 24 at which the holes are desired to be formed are positioned in registry with the bores 68, 74 of the clamping assembly inserts 66, 72. The cylinder assembly 78 is then actuated so that the upper clamp member 56 is moved downwardly into clamping engagement with the workpiece 24. The workpiece 24 is firmly held in position between the upper and lower clamp members 56, 58 as the inserts 66, 72 engage and compress the opposite sides of the workpiece 24 along paths which closely encircle the locations at which the holes are desired to be formed. The aforementioned engagement of the workpiece 24 by the inserts 66, 72 rigidifies the workpiece 24 in the regions through which the tools 52 are subsequently directed and is advantageous in this respect.

The burners 156 are then ignited so that the flames which are emitted from the ends of the burners 156 impinge upon the tools 52 adjacent the leading ends thereof, and the motor 120 is energized so that each tool 52 is rotated about its longitudinal axis. By rotating the tools 52 while heat is being applied thereto ensures that the heat is applied to each tool 52 in a uniform manner about the circumference of the tool 52. Heat is continued to be applied to the tools until the temperature of the portion of each tool 52 adjacent its leading end 106 is at least as great as the melting temperature of the material of the workpiece 24 through which the holes are desired to be formed. Since the tips of common steel cutting tools begin to turn red in color at a temperature of about 400° F., which temperature is typically above the melting temperatures of many types of thermoplastic materials, it has been found that a convenient technique of adjudging the tools 52 to be sufficiently heated is by simply waiting until the tips of the tools 52 become red in color. Furthermore and because the cutting tools 52 are relatively long, the heat from the flames impinging upon the tools 52 adjacent the leading ends thereof is not likely to damage the gears 116 or chucks 110 disposed above the tools 52.

Once the cutting tools 52 are sufficiently heated, the cylinder assembly 132 is actuated so that the rotating tools 52 are directed downwardly through the workpiece 24 to form the desired holes therein. The holes formed in the workpiece 24 are formed by what is believed to be a combined melting of the workpiece material and a cutting action by the tools 52 as the heated leading ends 106 engage and rotate against the workpiece material. As the holes are being formed, melted pieces and/or cut chips of material which have been removed from the site of each hole are transported upwardly and out of the insert bores 74 by the flutes of the tools 52. Thus, the rotating flutes 108 of the tools 52 prevent a build-up of melted pieces and/or cut chips at the site of the formed holes and are advantageous in this regard.

Upon complete passage of the leading end 106 of each tool 52 through the workpiece material, the cylinder assembly 132 is deactuated so that the tools 52 are withdrawn from the clamp members 56, 58 and returned to their raised positions above the clamp members 56, 58. The cylinder assembly 78 is then de-actuated to return the upper clamp member 56 to its raised position above the lower clamp member 58. The workpiece 24 may then be removed from the cut-out 30 of the lower clamp member 58.

Figure 9:
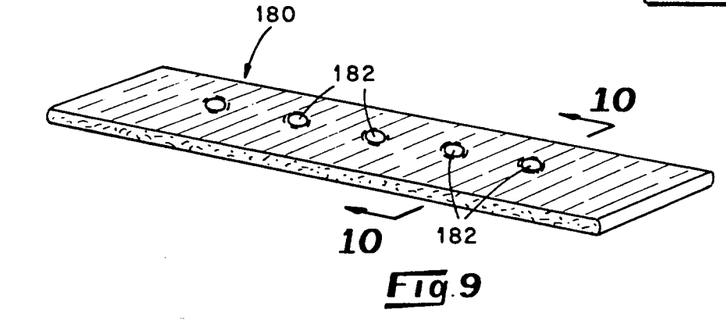
FIG. 9 is a perspective view of a strap having holes which have been formed therein by the FIG. 1 apparatus.
Figure 10:
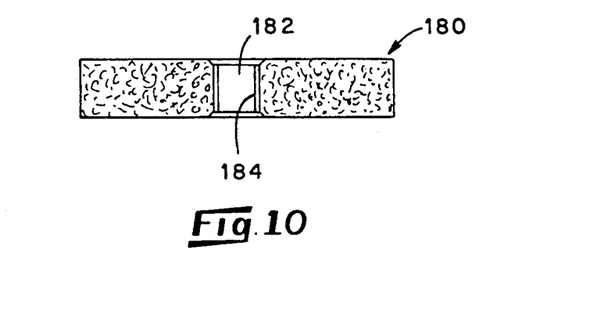
FIG. 10 is a cross-sectional view taken along line 10—10 of FIG. 9.

There is shown in FIGS. 9 and 10 a workpiece 180 having holes 182 which have been formed with the apparatus 20. As best shown in FIG. 10, the edges of each hole 182 is devoid of flash or melt build-up. Thus, the holes 182 are relatively clean in appearance and accommodate the installation of grommets or eyelets if desired. Furthermore, each side face of the workpiece 180 appears slightly compressed about the circumference of each hole 182. The compressed circumferences of the holes 182 are formed by the inserts 66, 72 during the hole-forming operation and aid in the bonding of the various threads or yarns of the woven fabric in the areas of the entrance and exit ends of the formed hole 182. Moreover, the inside surface of each hole 182 is lined with a thin layer 184 of smoothened material as a consequence of the passage of the heated tool 52 therethrough, and this thin layer 184 prevents the material adjacent the hole 182 from appearing frayed. On the other hand, this layer 184 is not so thick that cracks are likely to form along the inside surface of the holes 182. Still further, the passage of the tools 52 through the workpiece material along a linear path oriented generally normal to the upper surface of the workpiece ensures that each radial cross-section of a formed hole is circular in shape and uniform in size with the radial cross-sections of every other one of the formed holes.

Another advantage provided by the apparatus 20 relates to the replaceability of the inserts 66, 72 of the clamp members 56, 58. If, for example, it is desired to form holes within a workpiece with cutting tools which are either larger or smaller than the diameter of the inserts 56, 72, the inserts 66, 72 may be removed from the clamp members 56, 58 and replaced with inserts having bores which are sized in accordance with the diameter of the cutting tools to be used. Thus, holes of different sizes can be formed in a workpiece by mounting cutting tools of the appropriate size within the chucks 110 and installing inserts within the clamp members 56, 58 which include bores which correspond in size with the diameter of the cutting tools.

It will be understood that numerous modifications and substitutions may be had to the aforedescribed embodiment 20 without departing from the spirit of the invention. For example, although the aforedescribed apparatus 20 has been shown and described as including switches by which the operation of the apparatus may be manually controlled, an apparatus in accordance with the broader aspects of the present invention may include controls, such as timers and sequencing devices, for automatically controlling the operation of the apparatus. In addition, an electronic ignition system may be incorporated within the manifold assembly 154 for automatically igniting the burners 156. Accordingly, the aforedescribed embodiment 20 is intended for the purpose of illustration and not as limitation.

I claim:

1. An apparatus for forming a hole in webbing constructed of thermoplastic material comprising:
 a clamping assembly for holding the webbing in a stationary condition for working thereon;
 a rotatable drilling tool including an elongated shank having a leading end and at least one flute which spirals along the periphery of the shank from the leading end thereof, the drilling tool being supported adjacent the clamping assembly for rotation about a rotation axis corresponding with the longitudinal axis of shank and for movement of the leading end of the tool along a linear path corresponding with the rotation axis into and out of the webbing held by the clamping assembly;
 means connected to the drilling tool for rotating said drilling tool about its rotation axis;
 means associated with the drilling tool for heating a portion of the drilling tool shank adjacent the leading end thereof to a temperature which is at least as great as the melting temperature of the thermoplastic material of the webbing; and
 means for directing the leading end of the drilling tool along the linear path into and out of the webbing as the tool is rotated so that a hole is formed in the webbing by heating the drilling tool shank as aforesaid and then directing the leading end of the drilling tool into and out of the webbing as aforesaid.

2. The apparatus as defined in claim 1 wherein the clamping assembly includes a pair of opposing clamp members between which the webbing may be clamped for working thereon, each clamp member includes an opening which is aligned with the opening of the other clamp member so that by clamping the webbing between the clamp members so that the location in the webbing at which hole is desired to be formed is positioned in registry with the aligned openings of the clamp members and by directing the leading end of the heated drilling tool through the aligned openings, the leading end of the tool passes through the webbing to form the desired hole therein.

3. The apparatus as defined in claim 2 wherein the clamping assembly includes an insert positioned within each of the aligned openings of the clamp members, each insert including a central bore sized to permit the leading end of the drilling tool to pass therethrough during a hole-forming operation, and each of the inserts including one end surface which generally faces the one end surface of the other insert for engaging a corresponding side of the webbing when the clamp members are clamped about the webbing so that the regions of the webbing closely encircling the location in the webbing at which the hole is desired to be formed are compressed between the one end surfaces of the inserts.

4. The apparatus as defined in claim 3 wherein the diameter of each of the central bores of the inserts corresponds to that of the drilling tool as measured across its leading end.

5. The apparatus as defined in claim 4 wherein the aligned openings of the clamp members are internally-threaded, and each insert is threadably received by a corresponding one of the internally-threaded openings to accommodate a removal of each insert from its corresponding clamp member.

6. The apparatus as defined in claim 2 further including a frame, one of the clamp members is fixed in a stationary condition with respect to the frame, and the other of the clamp members is supported by the frame for movement toward and away from said one clamp member along a linear path which maintains the aligned openings of the clamp members in registry with one another.

7. The apparatus as defined in claim 6 further comprising means associated with the frame for moving said other clamp member toward and away from said one clamp member for clamping and releasing webbing positioned between the clamp members.

8. The apparatus as defined in claim 2 wherein the rotatable drilling tool is supported so that its rotation axis is positioned in registry with the aligned openings of the clamp members and the means for directing is adapted to guide the drilling tool linearly along the linear path through the aligned openings and webbing while maintaining the rotation axis in registry with the aligned openings.

9. The apparatus as defined in claim 1 wherein the heating means includes a gas-fueled burner supported adjacent the drilling tool for directing a flame toward the portion of the drilling tool shank adjacent the leading end thereof.

10. The apparatus as defined in claim for simultaneously forming a series of holes in webbing constructed of thermoplastic material wherein said drilling tool is a first drilling tool and the apparatus includes additional drilling tools of like construction supported adjacent the clamping member in a parallel relationship with one another and with said first drilling tool, said rotating means is connected in driving relationship to said additional drilling tools for rotation of each additional tool about its longitudinal axis, said heating means is adapted to heat each of the additional tools adjacent the leading ends thereof, and said directing means is adapted to direct the leading ends of all of the drilling tools simultaneously through the webbing held by the clamping assembly as the drilling tools are rotated.

11. The apparatus as defined in claim 10 wherein the drilling tools are connected to one another so that rotation of one tool by the rotating means effects a rotation of all of the drilling tools.

12. An apparatus for forming a hole in webbing of thermoplastic material comprising:
 a frame;
 a clamping assembly for holding the webbing in a stationary condition for working thereon, said clamping assembly including one clamp member supported by the frame in a stationary relationship therewith and another clamp member which is supported adjacent the one clamp member for movement toward and away from the one clamp member for selectively clamping webbing which is positioned between the clamp members or releasing the webbing from a clamped condition between the clamp members;

means associated with said another clamp member for moving said another clamp member toward and away from the one clamp member as aforesaid;

a rotatable drilling tool including an elongated shank having a leading end and at least one flute which spirals along the periphery of the shank from the leading end thereof, the drilling tool being supported by the frame adjacent the clamping assembly for rotation about a rotation axis and for movement of the leading end of the tool along a linear path which corresponds with the rotation axis of the tool into and out of the webbing held by the clamping assembly;

means associated with the frame for heating a portion of the drilling tool shank adjacent the leading end thereof to a temperature which is at least as great as the melting temperature of the thermoplastic material of the webbing; and means associated with the drilling tool for directing the leading end of the drilling tool along the linear path into and out of the webbing as the tool is rotated about its rotation axis for forming a hole in the webbing by heating the drilling tool shank as aforesaid and then directing the leading end of the drilling tool into and out of the webbing as aforesaid so that material is removed from the site of the hole by the leading end of the tool shank and is transported from the hole site by the flute of the tool shank.

13. The apparatus as defined in claim 12 wherein webbing includes a substantially planar side surface and the clamping assembly is adapted to hold the webbing for working thereon so that its planar side surface is oriented substantially perpendicular to the rotation axis of the drilling tool and so that the linear path of movement of the drilling tool is substantially normal to the planar side surface.

14. The apparatus as defined in claim 12 wherein the frame includes at least one guideway which is associated with said another clamp member in a manner which permits said another clamp member to be slidably moved along said guideway and so that as said another clamp member is moved toward and away from the one clamp member as aforesaid, said another clamp member is guided along said guideway.

15. The apparatus as defined in claim 12 wherein the frame includes at least one guide rod which is associated with said drilling tool in a manner which permits the drilling tool to be slidably moved along the guide rod as the tool is moved linearly along the linear path as aforesaid so that as the drilling tool is directed into and out of the webbing during a hole-forming operation, the tool is guided along the guide rod.

16. The apparatus as defined in claim 12 for simultaneously forming a series of holes in webbing constructed of thermoplastic material wherein said drilling tool is a first drilling tool and the apparatus includes additional drilling tools of like construction supported adjacent the clamping member in a parallel relationship with one another and with said first drilling tool, said rotating means is connected in driving relationship to said additional drilling tools for rotation of each additional tool about its longitudinal axis, said heating means is adapted to heat each of the additional tools adjacent the leading ends thereof, and said directing means is adapted to direct the leading ends of all of the drilling tools simultaneously through the webbing held by the clamping assembly as the drilling tools are rotated.

17. A method for forming a hole in webbing constructed of thermoplastic material comprising the steps of:

securing the webbing in a stationary condition for working thereon;

providing a drilling tool having an elongated shank including a leading end and at least one flute which spirals along the periphery of the shank from the leading end thereof;

heating a portion of the drilling tool shank adjacent the leading end thereof to a temperature which is at least as great as the melting temperature of the thermoplastic material of the webbing;

rotating the drilling tool about a rotation axis which corresponds with the longitudinal axis of the tool shank; and directing the leading end of the heated drilling tool through the webbing as the tool is rotated about its rotation axis to form a hole in the webbing.

18. The method as defined in claim 17 wherein the step of heating includes the steps of rotating the drilling tool shank about its rotation axis and directing a flame toward said shank portion so that said shank portion is uniformly heated about its periphery by the flame.

19. The method as defined in claim 18 wherein the step of directing the leading end of the heated drilling tool through the webbing moves the drilling tool along a linear path which corresponds with the longitudinal axis of the tool shank.

20. The method as defined in claim 16 wherein the webbing includes a substantially planar side surface and the step of securing the webbing in a stationary condition for working thereon orients the planar side surface of the webbing in a substantially perpendicular relationship with the rotation axis of the tool shank so that the linear path of movement of the drilling tool during the step of directing is substantially normal to the planar side surface of the webbing.

* * * * *